US012786292B2

(12) United States Patent
Banerjee et al.

(10) Patent No.: US 12,786,292 B2
(45) Date of Patent: Nov. 3, 2026

(54) ADAPTIVE MODULAR SERVER PARAMETER EXTRACTION AND MONITORING AND METHODS AND SYSTEMS OF THE SAME

(71) Applicant: T-Mobile USA, Inc., Bellevue, WA (US)

(72) Inventors: Arin Banerjee, Kent, WA (US); Prasad Vasantrao Changole, Issaquah, WA (US); Chaitanya Talavata Laxminarayana, Austin, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 19/181,687

(22) Filed: Apr. 17, 2025

(65) Prior Publication Data

US 2026/0332681 A1 Oct. 22, 2026

(51) Int. Cl.
*H04L 67/63* (2022.01)

(52) U.S. Cl.
CPC .................................... *H04L 67/63* (2022.05)

(58) Field of Classification Search
CPC ........................................................ H04L 67/63
See application file for complete search history.

(56) References Cited

U.S. PATENT DOCUMENTS

| | | | | |
|---|---|---|---|---|
| 8,631,078 | B2 | 1/2014 | Wherry et al. | |
| 8,640,023 | B1 | 1/2014 | Murray | |
| 8,819,150 | B1 | 8/2014 | Osinga et al. | |
| 9,596,313 | B2 | 3/2017 | Zhao | |
| 10,268,768 | B2 | 4/2019 | Niu | |
| 11,507,256 | B2 | 11/2022 | Adika et al. | |
| 12,387,050 | B1 * | 8/2025 | Galvin | G06F 40/30 |
| 12,399,889 | B1 * | 8/2025 | Hensley | G06F 16/2379 |
| 12,436,966 | B1 * | 10/2025 | Hensley | G06F 16/258 |
| 12,650,995 | B2 * | 6/2026 | Shin | G06F 16/24578 |
| 2026/0057028 | A1 * | 2/2026 | Kim | G06F 16/958 |
| 2026/0154526 | A1 * | 6/2026 | Myers | G06N 3/042 |

FOREIGN PATENT DOCUMENTS

| | | | |
|---|---|---|---|
| CN | 111506786 | B | 10/2023 |
| EP | 3356965 | A1 | 8/2018 |
| JP | 2007523395 | A | 8/2007 |
| WO | 2018109589 | A1 | 6/2018 |

* cited by examiner

*Primary Examiner* — Todd L Barker
(74) *Attorney, Agent, or Firm* — Ashurst Perkins Coie US LLP

(57) ABSTRACT

Systems and methods for extracting and processing parameters associated with dynamic servers are disclosed herein. The system can receive a server parameter request that includes an attribute value (e.g., associated with a particular location or device configuration). Based on the attribute value, the system can generate a set of servers that are compatible with the attribute value and generate a routing key that enables querying the servers. The system can provide the routing key to software applications communicably linked with the servers to generate extracted data elements. The system can provide the extracted data elements to an LLM to generate a tabulated dataset for display on a device.

20 Claims, 8 Drawing Sheets

400

| Attribute Database 402 | |
|---|---|
| Attribute Value 404 | Server Identifier 406 |
| Value 1 | Server 1 |
| | Server 2 |
| | Server 3 |
| Value 2 | Server 2 |
| | Server 3 |
| | Server 4 |
| Value 3 | Server 1 |
| | Server 3 |
| | Server 4 |

*FIG. 4*

500

Schema Database 502

| Schema | Server Identifier 504 | Element Identifier 506 | Position Information 508 |
|---|---|---|---|
| Schema 510-1 | Server 1 | Element 1 | Coordinate(s) A |
| | | Element 2 | Coordinate(s) B |
| | | Element 3 | Coordinate(s) C |
| Schema 510-2 | Server 2 | Element 1 | Coordinate(s) D |
| | | Element 2 | Coordinate(s) E |
| | | Element 4 | Coordinate(s) F |
| | | Element 5 | Coordinate(s) G |
| Schema 510-3 | Server 3 | Element 1 | Coordinate(s) H |
| | | Element 3 | Coordinate(s) I |

*FIG. 5*

600

| Tabulated Dataset 602 | | |
|---|---|---|
| Server Identifier 604 | Parameter Identifier 606 | Parameter Value 608 |
| Server 1 | Parameter 1 | Value 1 |
| | Parameter 2 | Value 2 |
| | Parameter 3 | Value 3 |
| Server 2 | Parameter 1 | Value 4 |
| | Parameter 2 | Value 5 |
| | Parameter 3 | Value 6 |
| Server 3 | Parameter 1 | Value 7 |
| | Parameter 2 | Value 8 |
| | Parameter 3 | Value 9 |

*FIG. 6*

ADAPTIVE MODULAR SERVER PARAMETER EXTRACTION AND MONITORING AND METHODS AND SYSTEMS OF THE SAME

BACKGROUND

A server can include a device that provides information to other devices called "clients" on a computer network. This architecture is called the client-server model. Servers can provide various functionalities, often called "services," such as sharing data or resources among multiple clients or performing computations for a client. Typical servers are database servers, file servers, mail servers, print servers, web servers, game servers, and application servers.

For example, a web server includes computer software and underlying hardware that accepts requests via the HyperText Transfer Protocol (HTTP) (e.g., a network protocol created to distribute web content). A user agent, commonly a web browser, can initiate communication by making a request for a webpage or other resource using HTTP, and the server can respond with the content of that resource or an error message. Web servers can include one or more features, including static content serving, HTTP support, logging, dynamic content saving, virtual hosting, and/or other suitable elements.

BRIEF DESCRIPTION OF THE DRAWINGS

Detailed descriptions of implementations of the present invention will be described and explained through the use of the accompanying drawings.

FIG. 4 is a schematic of a data structure illustrating an attribute database, in accordance with aspects of the present technology.

FIG. 5 is a schematic of a data structure illustrating a schema database, in accordance with aspects of the present technology.

FIG. 6 is a schematic of a data structure illustrating a tabulated dataset, in accordance with aspects of the present technology.

Figure 1:
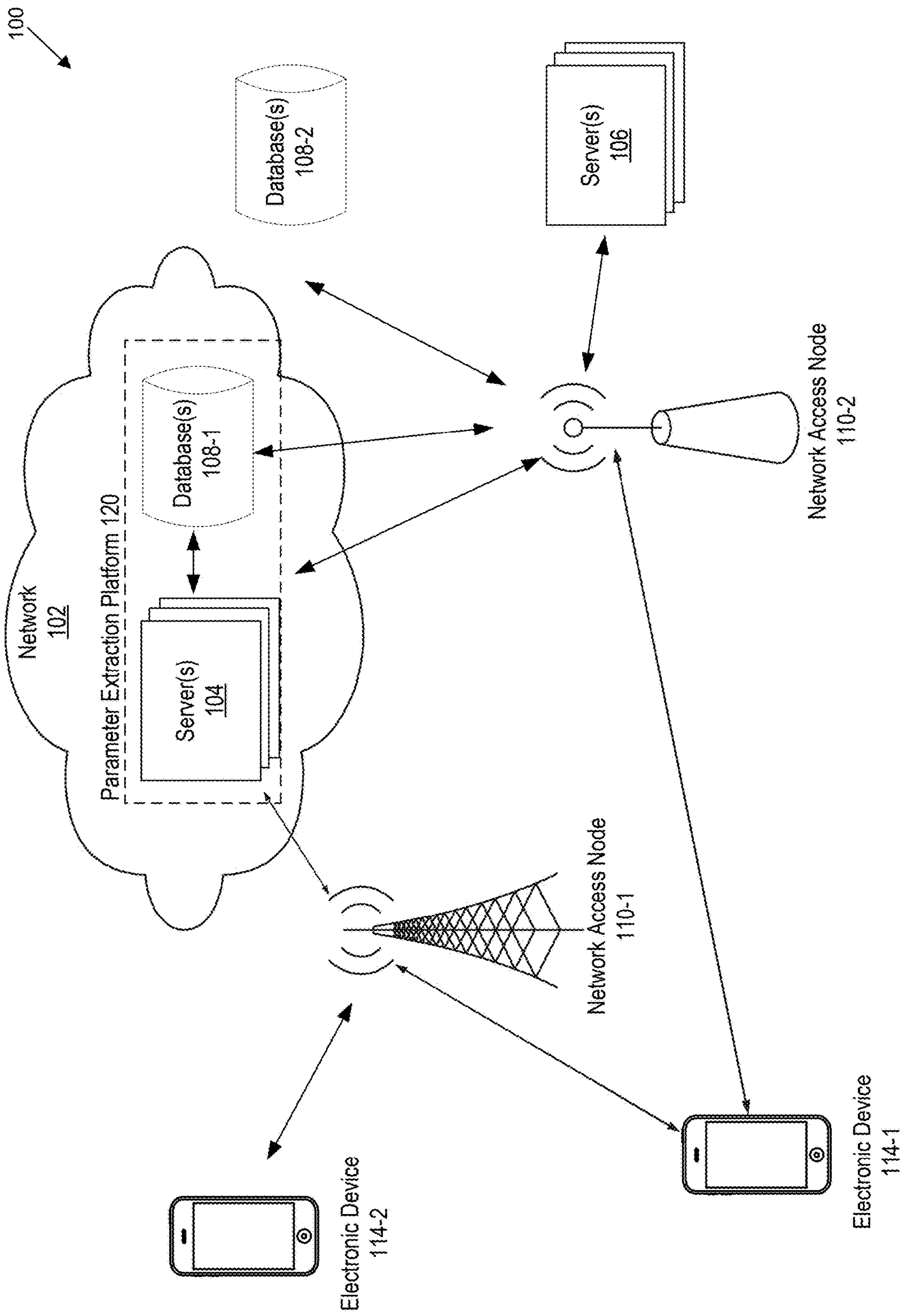
FIG. 1 is a block diagram that illustrates an environment for extracting and analyzing tabulated data associated with server parameters, in accordance with aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Due to the increasing complexity of servers and their associated features and/or security functions, clients or other devices often require complex configurations that enable connectivity with a given server or telecommunication network. To illustrate, a cloud-computing system can exhibit a variety of security features, access protocols, and/or technical features (e.g., upload or download rates, latencies, or bandwidths) that limit, restrict, or manage connectivity with different devices. Moreover, such features can depend upon attributes of a device, such as the device's location, security features, firmware, and/or software attributes. As such, a device attempting to connect to a particular server, server system, or associated cloud-computing system can benefit from information regarding such features or parameters to improve connectivity decisions.

In conventional systems, a device can query a server to receive information relating to server parameters. For example, conventional systems store information in a key, where the information relates to a server and/or an associated telecommunication network. The stored information can include associated access protocols, server addresses, security credentials, connectivity requirements, or other parameters, enabling connectivity with the server and/or associated telecommunication network according to the stored parameters. However, server-associated parameters can change over time, leading to undetected connectivity errors, security breaches, or other similar errors when such parameters that enable access to the server are not updated manually at a sufficient frequency.

Furthermore, in conventional systems, different servers can have different communication or query formats, protocols, or communication-related restrictions, thereby complicating attempts to communicate with the servers (e.g., to request or update server-related parameters). For example, in conventional systems, attempts to retrieve requested parameters can be difficult unless query protocols with the servers in question are already known. When a server's communication protocols change or vary, the system cannot regain the ability to communicate with the system without manual troubleshooting or reconfiguration of parameters associated with querying the server, leading to a high likelihood of errors in querying the server for associated parameters or other information. Similarly, a device associated with a conventional system may require manual configuration to communicate with a server that is newly accessible to the system and/or device (e.g., of which the system does not have prior information).

The systems and methods disclosed herein enable automated, dynamic extraction and analysis of server-related parameters that depend on attributes associated with an associated device or user, thereby improving the adaptability and resilience of device-server connectivity.

For example, the system can receive a server parameter request from a device that includes an attribute associated with the device, such as a location associated with the device or a query generated by the device. As such, the system enables location- or attribute-specific, tailored querying of servers to enable improved connections with associated devices. The system can transmit the attribute information to an attribute database to determine identifiers of servers that are compatible with the attribute information. To illustrate, based on the attribute information, the system can receive identifiers of servers that are associated with telecommunication networks that are capable of a connection with a particular device (e.g., at the received location or consistent with the attribute information). Based on the identifiers of the servers, the system can generate a routing key that enables selection of a subset of modular software applications that communicate with the identified servers. For example, each modular software application enables communication with a different server (e.g., to retrieve server parameters associated with the attribute of the server parameter request).

Based on the routing key, the system may provide the attribute (e.g., a location) associated with the server parameter request to each selected modular software application to enable extraction of parameter information from each of the servers associated with the modular software applications. To illustrate, the system can receive, from each of the servers and via the corresponding modular software application, scraped data in an unformatted format that includes information associated with access parameters, performance parameters, security values, and/or other suitable information associated with the particular server and/or associated telecommunication network.

In some implementations, the system generates and/or modifies schemas associated with the modular software applications that specify the manner in which the applications communicate with the corresponding servers. The schemas can include particular access parameters and/or information related to how to retrieve information from the servers that is specific to the attribute or location of the server parameter request. The system can update such schemas with a pre-determined periodicity to improve the resilience of the modular software application to changing access conditions associated with the servers. Additionally or alternatively, the system detects availability of a new server that is compatible with the attribute or location of the server parameter request and generates a modular software application that enables querying of the new server accordingly. As such, the system can dynamically adapt to a changing network of servers without requiring manual intervention.

The system can generate an input to a large-language model (LLM) that includes instructions for extracting, analyzing, and/or otherwise processing the data from the modular software applications associated with the servers. For example, the system generates a textual prompt that specifies particular parameters to be extracted from the scraped data, including associated formatting or display instructions. The textual prompt can include instructions to generate a tabulated dataset that enables visualization or organization of particular parameters for each of the servers. Based on the prompt, the LLM can generate a response that comprises the requested information, which the system can transmit to the device in satisfaction of the server parameter request. Based on the information transmitted to the device, the device and/or other devices can evaluate which servers and/or telecommunication networks associated with the servers are compatible with and/or consistent with connectivity requirements or preferences, thereby enabling adaptive, modular selection of telecommunication networks based on associated parameters.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Server Communication Environment

FIG. 1 is a block diagram that illustrates an environment 100 for extracting and analyzing tabulated data associated with server parameters, in accordance with aspects of the present technology. The environment 100 includes a network 102 that includes one or more devices or systems, such as server(s) 104. In some implementations, the network 102 includes a parameter extraction platform 120, which enables extraction and processing of server-related parameter data. The parameter extraction platform 120 can include server(s) 104 and/or database(s) 108-1. Additionally or alternatively, one or more of database(s) 108-2 are external to the network 102 and/or parameter extraction platform 120. In some implementations, network 102 and/or parameter extraction platform 120 include one or more electronic devices, such as electronic device 114-1.

The network 102 can interface with one or more network access nodes (NANs) 110-1 or 110-2 (e.g., base stations), which enable communication with one or more electronic devices external to, but communicable with, the network, such as an electronic devices 114-1 or 114-2 and/or server(s) 106. Network access nodes 110-1 or 110-2 enable communication of devices, such as electronic device 114, with other devices or servers, such as those associated with network 102 (e.g., server(s) 104 and/or associated database(s) 108). The network access nodes 110-1 or 110-2 can also enable communication between an electronic device (e.g., electronic device 114-1) and other devices external to the network 102, such as electronic device 114-2 and/or server(s) 106. As such, the network 102 enables flexible communication between devices, enabling them to communicate with and/or access features of other nodes (e.g., devices or servers) of the server communication environment 100.

In some implementations, the network 102 includes a 5G network. Server(s) 104 associated with the network 102 can include one or more systems associated with the telecommunication network, such as hardware or software components associated with the functioning of the network access node(s) 110-1 or 110-2, including storage, processors, or other components.

The parameter extraction platform 120 can include a pipeline, framework, and/or a workflow for extracting, processing, and/or displaying data associated with the system, such as server parameter information. For example, the parameter extraction platform 120 includes a device, such as a server 104, that can receive server parameter requests that include queries for information (e.g., parameters) associated with servers external to or internal to the parameter extraction platform 120 and/or the network 102. Server(s) 104 can include hardware or software components associated with data storage, data processing, and/or parameter extraction. In some implementations, server(s) 104 include virtual machines (e.g., associated with a Kubernetes cluster) to process data processing tasks. The server(s) 104 can each be stand-alone systems and/or decentralized systems, such as in the case of a cloud-computing system.

The parameter extraction platform 120 can include one or more servers with specialized functions. For example, different servers of servers 104 include different modular software applications capable of communicating with network access nodes 110-1 and/or 110-2 and/or other suitable devices. To illustrate, a first server of parameter extraction platform 120 can communicate with a particular external server (e.g., one of server(s) 106) via a corresponding modular software application. In some implementations, one or more of server(s) 104 house the parameter extraction platform 120. Additionally or alternatively, the parameter extraction platform 120 operates across various devices of the environment 100, including devices external to the network 102 (e.g., the database(s) 108-2, server(s) 106, and/or electronic device(s) 114-1).

The environment 100 can include one or more user equipment systems, such as electronic devices 114-1 or 114-2. A user equipment system can include hardware or software components associated with user equipment (e.g., an electronic device, such as a mobile device, a laptop/desktop computer, a vehicle, and/or other suitable devices). For example, electronic devices 114-1 or 114-2 include user equipment systems. A user equipment system can include physical components, such as processors, storage media, user displays, and/or other components. In some implementations, the user equipment system includes or executes data processing tasks associated with the parameter extraction platform 120. The network access nodes 110-1 or 110-2 can enable communication between the electronic devices 114-1 or 114-2 and devices associated with the network 102 and/or environment 100. In some implementations, the electronic device(s) 114-1 or 114-2 execute tasks associated with the network 102 or parameter extraction platform 120 (e.g., one or more of server(s) 104). Additionally or alternatively, the electronic device(s) 114-1 or 114-2 are configured or configurable to communicate with one or more of server(s) 106 external to the network 102.

Servers can be associated with server identifiers and/or addresses. A server identifier can include an Internet address (e.g., uniform resource locator (URL) address), Internet Protocol (IP) addresses, Media Access Control (MAC) addresses, and/or other unique identifiers that facilitate the identification and access of the servers. The parameter extraction platform 120 can use the identifiers to send queries, retrieve data, and perform other operations associated with extracting and analyzing server parameters. In some implementations, the server identifiers are stored in a database, such as database(s) 108-1 or 108-2, accessible by the parameter extraction platform 120.

Servers can be associated with one or more server parameters. The parameters can include network latency, server load, response time, bandwidth availability, and/or other parameters associated with connections between devices and servers or telecommunication networks. For example, server parameters include information associated with webpages stored on one or more of server(s) 106, such as telecommunication subscription plan details such as pricing structures, data allowances, and associated costs per user or device. Such server parameter information can be stored on the servers in a webpage-related format (e.g., Hypertext Markup Language (HTML) or another suitable protocol). For example, server(s) 106 include webpage data, including user interfaces, that facilitate the access, display, and modification of associated server parameters. By enabling extraction and processing of server parameters associated with servers external to the network 102, the parameter extraction platform 120 enables compilation of information associated with network connections with other systems and/or telecommunication networks, enabling evaluation of connectivity decisions in an adaptable, modular manner.

The environment 100 can include one or more databases (e.g., within and/or external to the network 102). For example, the environment 100 includes the database 108-1 enabling storage, retrieval, analysis, and/or processing of information associated with servers, such as upload/download speeds, server access protocols, requirements, costs (e.g., prices), security credentials, and/or other suitable information. Additionally or alternatively, database(s) 108-1 or 108-2 can include machine learning (ML) model parameters, application programming interfaces (APIs), software application scripts and/or packages, and/or other suitable data. The database(s) 108-1 and/or 108-2 can include hardware components, software components, or a combination thereof. In some implementations, the environment 100 can communicate with databases external to the network 102 (e.g., the database(s) 108-2) and store or access data within the databases. Databases can be associated with distributed and/or localized architectures; for example, the database(s) 108-1 and/or 108-2 can be incorporated into a common cloud storage system.

Transformer for Neural Network

To assist in understanding the present disclosure, some concepts relevant to neural networks and ML are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), may represent a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant-trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of an LLM may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
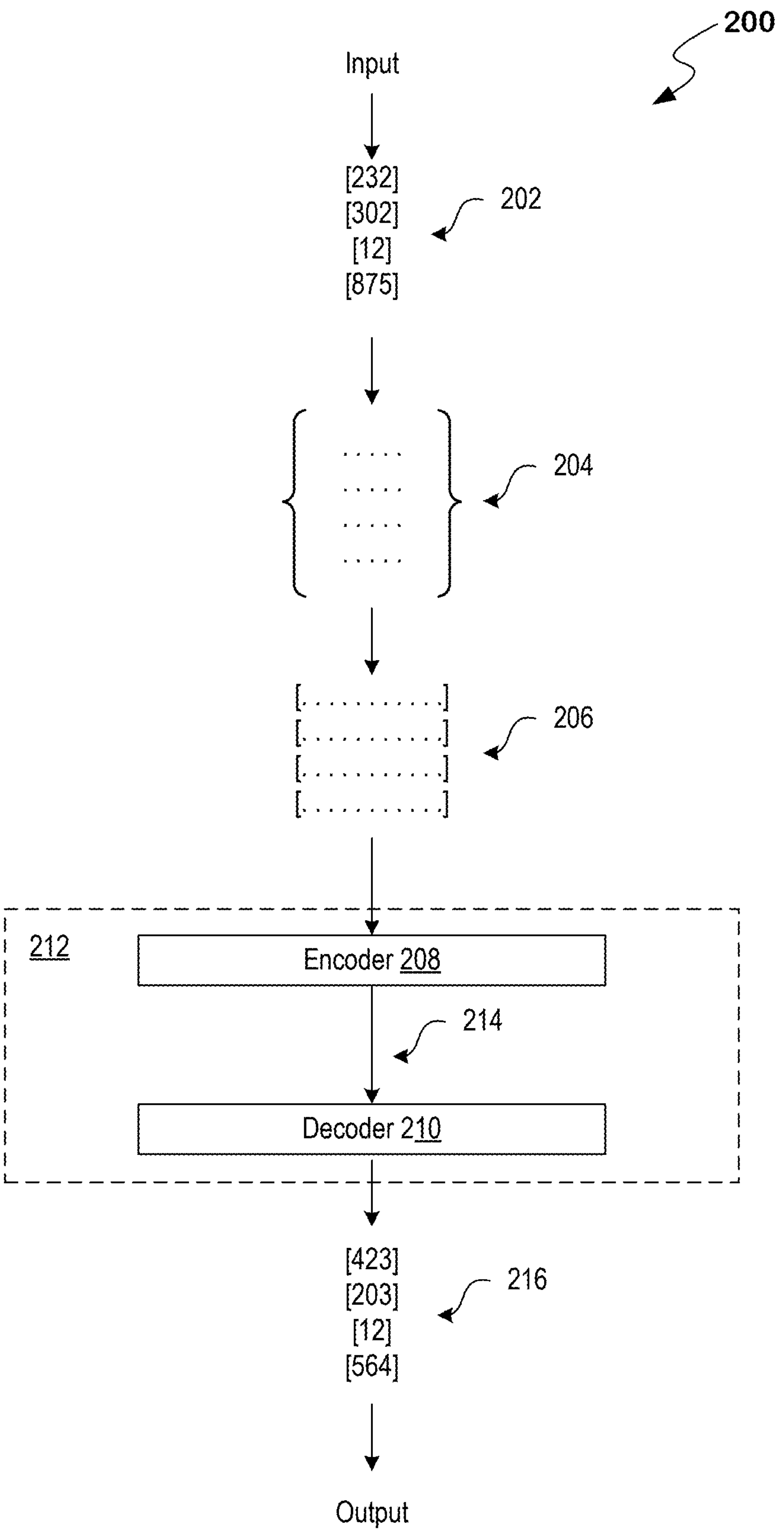
FIG. 2 is a block diagram of an example transformer associated with neural network architecture of an artificial intelligence, in accordance with aspects of the present technology.

FIG. 2 is a block diagram 200 of an example transformer 212. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any ML-based language model, including language models based on other neural network architectures such as RNN-based language models.

The transformer 212 includes an encoder 208 (which can comprise one or more encoder layers/blocks connected in series) and a decoder 210 (which can comprise one or more decoder layers/blocks connected in series). Generally, the encoder 208 and the decoder 210 each include a plurality of neural network layers, at least one of which can be a self-attention layer. The parameters of the neural network layers can be referred to as the parameters of the language model.

The transformer 212 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 2 illustrates an example of how the transformer 212 can process textual input data. Input to a language model (whether transformer-based or otherwise) typically is in the form of natural language that can be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for simplicity. In general, the token sequence that is inputted to the transformer 212 can be of any length up to a maximum length defined based on the dimensions of the transformer 212. Each token 202 in the token sequence is converted into an embedding vector 206 (also referred to simply as an embedding 206). An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some examples, the numerical value of the token 202 can be used to look up the corresponding embedding in an embedding matrix 204 (which can be learned during training of the transformer 212).

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as the latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 is able to generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some examples, the input provided to the transformer 212 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Parameter Extraction Platform

Figure 3:
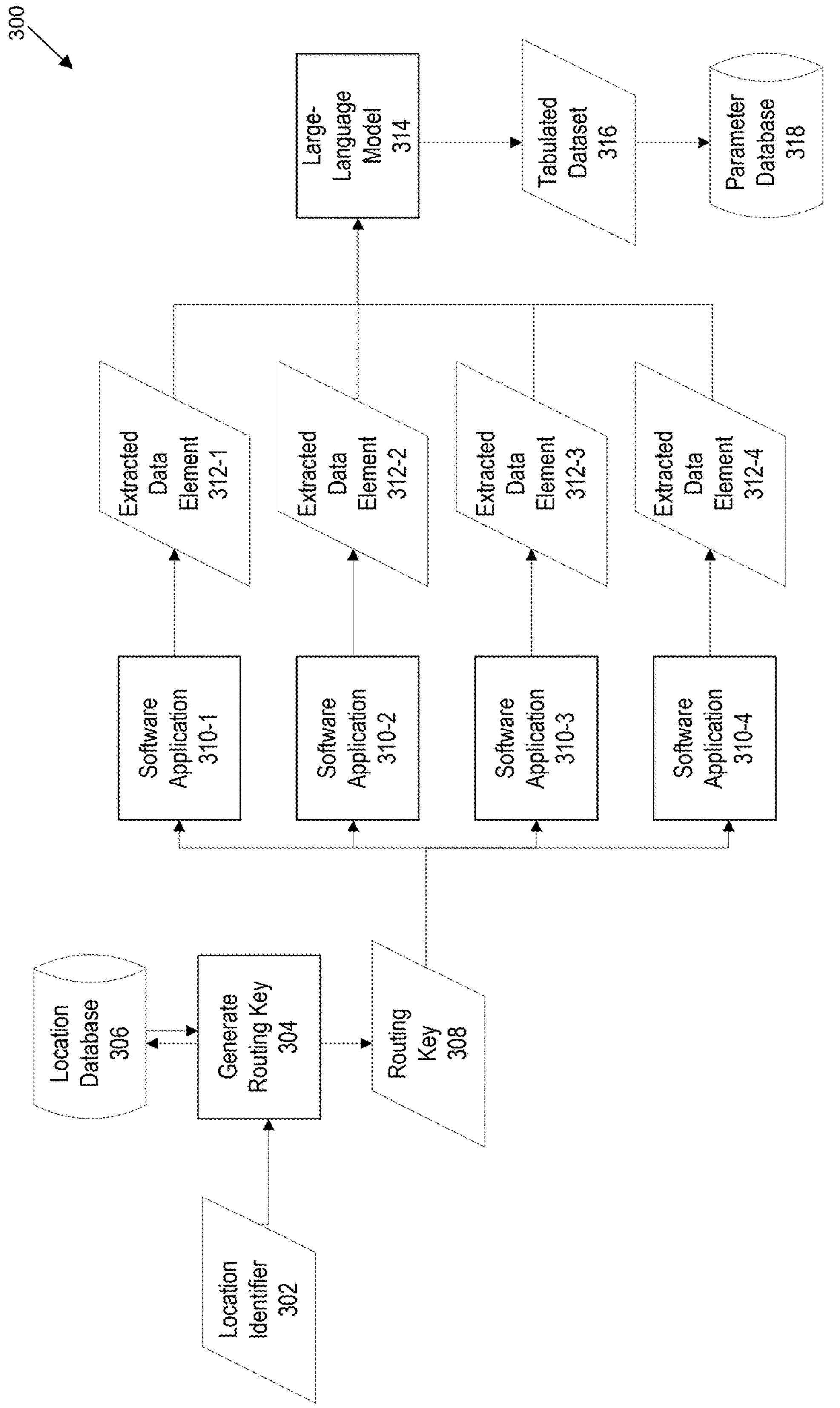
FIG. 3 is a block diagram that illustrates a flow for extracting and analyzing server parameters using modular software applications based on a generated routing key, in accordance with aspects of the present technology.

FIG. 3 is a block diagram that illustrates a flow 300 for extracting and analyzing server parameters using modular software applications based on a generated routing key. The flow 300 can enable extraction of parameters associated with servers in a modular, dynamic manner to enable improved connectivity between devices and telecommunication networks. For example, the parameter extraction platform 120, using the flow 300, can extract and process parameters stored on servers that are each associated with a different telecommunication network, where the parameters include information relating to connectivity with the corresponding telecommunication network associated with a particular location or set of device/user attributes. By doing so in a modular, dynamic manner, the parameter extraction platform 120 enables improved, accurate connectivity decisions based on connection requirements or preferences.

The parameter extraction platform 120 can receive a server parameter request that includes one or more attribute values, such as location identifier 302 (e.g., a locator value). A server parameter request can include a request (e.g., textual, audio, image, video and/or multimedia) for parameters associated with accessing telecommunication networks (e.g., in an indicated location or based on indicated user/device attributes). The server parameter request (e.g., the associated locator value or location identifier 302) can include a geographical indicator associated with a location, such as a postal code (e.g., a ZIP code), an address, a city name, a state name, and/or other suitable data. The locator value can be associated with a reference user residing at the specified location. By receiving such information, the parameter extraction platform 120 can query servers that store information relating to telecommunication networks that operate at the specified location for information, requirements, or parameters associated with the reference user's subscription to the corresponding telecommunication networks, thereby enabling evaluation of the available choices for a user at this location.

In some implementations, the server parameter request includes one or more attribute values, such as an attribute associated with a device (e.g., a device type, such as a mobile phone brand, a model, and/or associated capabilities). For example, the attribute value includes a serial number, MAC address, or another identifier of a reference device (e.g., associated with a reference user) requesting information relating to telecommunication networks compatible with the device. Additionally or alternatively, the attribute can specify information relating to one or more reference users (e.g., simulated users) of a telecommunication network, including a number of requested telecommunication lines (e.g., a number of family members), ages, and/or other demographic information. In some implementations, the attribute value of the server parameter request includes financial information associated with a reference user, such as a credit score, a number of years of credit, a simulated downpayment value, and/or other information that is relevant to telecommunication network subscriptions. The parameter extraction platform 120 can query the server using the information and provide potential network subscriptions that suit user profiles, device compatibility, and location, as specified in the server parameter request.

The parameter extraction platform 120 can transmit the attribute value(s) to an attribute database (e.g., the location database 306 of FIG. 3) to retrieve identifiers of servers that include information regarding associated telecommunication networks that are compatible with or otherwise associated with the attribute value(s). For example, the parameter extraction platform 120 receives a subset of server identifiers that each correspond to a telecommunication network that servers the particular location identifier 302 of the server parameter request.

FIG. 4 is a schematic of a data structure 400 illustrating an attribute database 402. The attribute database (e.g., a location database) can include lists of server identifiers (e.g., server identifiers 406) that are compatible with, consistent with, and/or otherwise associated with corresponding attributes (e.g., with attribute values 404), as shown in FIG. 4. Conversely, the attribute database can include lists of attribute values (e.g., attribute values 404) that are compatible, consistent with, and/or otherwise associated with corresponding server identifiers (e.g., the server identifiers 406). As such, the attribute database 402 facilitates the extraction of information pertaining to telecommunication network plans or subscriptions that are consistent with provided attribute values, such as postal codes, user demographic information, and/or device capabilities.

Thus, based on the attribute database 402, the parameter extraction platform 120 can retrieve a subset of servers (e.g., associated with a subset of telecommunication network providers) associated with a particular attribute. For example, the parameter extraction platform 120 retrieves, based on the attribute database 402, a subset of server identifiers (e.g., website/URL addresses) and/or a list of telecommunication network provider identifiers that provide network service at the specified location identifier 302 of FIG. 3. By receiving the subset of server identifiers, the parameter extraction platform 120 enables retrieval of parameters associated with telecommunication network providers, such as associated subscription information or technical specifications.

In some implementations, the parameter extraction platform 120 can update the attribute database (e.g., the location database 306) at a determined frequency. For example, the parameter extraction platform 120 can query servers (e.g., associated URL addresses) for information relating to coverage area, coverage requirements, and/or compatible attributes associated with corresponding telecommunication networks. Based on the queries, the parameter extraction platform 120 can update the attribute database to improve the accuracy of the information therein. For example, the parameter extraction platform 120 detects that a particular telecommunication network provider (e.g., associated with a corresponding server of the location database) expanded its geographical coverage and is therefore compatible with a modified list of attributes. Based on the detection, the parameter extraction platform 120 can update the location database by modifying the subset of server identifiers associated with the particular telecommunication network provider. In some implementations, the parameter extraction platform 120 can tailor the monitoring frequency to the telecommunication network provider (e.g., to the particular server identifier). For example, the parameter extraction platform 120 can determine that a first server identifier is to be queried for coverage area information at a first temporal frequency, while a second server identifier is to be queried for coverage area information at a second temporal frequency different from the first temporal frequency.

Based on retrieving a subset of server identifiers consistent with the server parameter request, such as a list of URL addresses associated with telecommunication networks that service the requested location identifier 302, the parameter extraction platform 120 can generate a routing key 308 at process 304 of FIG. 3, enabling extraction of parameters relating to the identified telecommunication networks. The routing key can include a set or list of server identifiers associated with the particular server parameter request. For example, the routing key 308 is a data structure (e.g., a YAML Ain't Markup Language (YAML) file) including a list of URL addresses associated with telecommunication network providers that provide network services to a location associated with the location identifier 302. In some implementations, the parameter extraction platform 120 can generate the routing key 308. For example, the parameter extraction platform 120 can convert a server identifier corresponding to an IP address to a domain name via a Domain Name System (DNS) and store the domain name within the routing key 308.

In some implementations, the routing key 308 includes a list of identifiers of software applications that enable communication with associated servers. For example, the routing key 308 includes a set of alphanumeric keys that identify software applications 310-1, 310-2, 310-3, and/or 310-4 (e.g., residing on server(s) 104 and/or database(s) 108-2). The alphanumeric key can include a string of characters (e.g., numbers and/or letters) identifying software modules or packages that enable communication with corresponding telecommunication network providers. For example, a software application (e.g., one or more of software applications 310-1, 310-2, 310-3, and/or 310-4) is communicably linked to a server identified by a server identifier (e.g., associated with a particular identifier of the routing key 308).

To illustrate, for each server identifier of the routing key, the parameter extraction platform 120 can provide the attribute value (e.g., the location identifier 302 of FIG. 3) to the corresponding software application. For example, for a given server identifier (e.g., or alphanumeric key) of the routing key 308, the parameter extraction platform 120 determines an associated software application of software applications 310-1, 310-2, 310-3, or 310-4 that is consistent with the given server identifier. The determined software application, via an API, can query the server (e.g., by scraping or navigating an associated webpage associated with the server) for information based on the attribute value. For example, the software application inputs the location identifier 302, such as a postal code, into a text box of a webpage associated with the server to navigate to a page that includes parameters associated with subscription plans that are available to users at the provided postal code. The software application (e.g., the software application 310-1) can extract a representation of the resulting webpage (e.g., an extracted data element, as discussed below) to enable processing and analysis of the associated server parameters.

An extracted data element (e.g., one of extracted data elements 312-1, 312-2, 312-3, and 312-4) can include a result from a query to a server. For example, the extracted data element includes webpage data, such as a record, document, or file that includes graphical and/or lexical information within a webpage associated with the server, such as a screenshot, an Extensible Markup Language (XML) file, an HTTP file, and/or another suitable data record. The extracted data element can include metadata indicating the particular URL from which the software application extracted the data element.

For example, the parameter extraction platform 120 tailors the software application 310-1 to the particular website format and/or webpage elements of the associated server identifier (e.g., of the associated telecommunication network's website). To illustrate, the parameter extraction platform 120 can generate a software application by determining a server address (e.g., a URL) associated with a server identifier. The parameter extraction platform 120 can transmit a webpage request to the associated server to view the webpage (e.g., via a web scraping service or an automated web browser). The parameter extraction platform 120 can receive the webpage data from the server that includes elements within the received webpage. For example, based on the webpage data, the parameter extraction platform 120 determines a list of elements within the webpage and associated positions of the elements within the webpage. Based on the element information of the webpage data, the parameter extraction platform 120 can generate a schema (e.g., a blueprint or set of instructions) for the server.

The software application can be modular. For example, different software applications are associated with different virtual machines, containers, or physical machines (e.g., different servers of server(s) 104). As such, the software applications can run in parallel, such as on a graphics processing unit (GPU)-type architecture, in addition to a central processing unit (CPU)-type architecture. Furthermore, the parameter extraction platform 120 can modify, update, or generate software applications without interfering with the ongoing execution of other software applications associated with the environment 100.

Subsequently, the software application (e.g., the software application 310-1) can use the schema to generate the software application that includes the schema and enables the software application to communicate with the associated server (e.g., access the webpage) accordingly. For example, the parameter extraction platform 120 can generate, using an LLM, a script and compile the script to generate the software application such that the software application can navigate webpages of the associated server according to the schema. In some implementations, the parameter extraction platform 120 stores the generated schema, associated with a particular software application, within a schema database.

FIG. 5 is a schematic of a data structure 500 illustrating a schema database 502. For example, the schema database includes schemas 510-1, 510-2, and 510-3. A schema can include a server identifier (e.g., of server identifiers 504), associated element identifiers (e.g., of element identifiers 506), and associated position information (e.g., of position information 508). As such, a schema enables an associated software application to interact with and/or navigate with respect to elements within a webpage associated with the corresponding server, thereby enabling the parameter extraction platform 120 to extract information relating to the server, such as server parameters relating to telecommunication network subscription plans.

Webpage elements (e.g., elements of the schema) can include one or more HTML, user interface, and/or other suitable components, such as input fields, buttons, links, images, tables, dropdown menus, and other interactive or display elements. The schema can identify the elements by their type (e.g., via an element identifier specifying the type and/or utility of a given element). The schema can include associated position information indicating a location for where the element is located on the webpage. For example, the schema includes a specification of elements within a webpage that includes an XPath specification specifying a location of an element within an HTML or XML document structure; Cascading Style Sheet (CSS) selector information identifying elements based on a class, identifier, tab, and/or hierarchical information; coordinates including horizontal and vertical pixel- or percentage-based coordinates that indicate an element's position relative to the webpage layout; and/or other attributes or identifiers, such as names, classes, identifiers, or custom attributes.

In some implementations, the schema includes information relating to elements on more than one webpage and/or associated with complex user interfaces on websites. For example, the schema for a given server can include elements (and positions on the webpage thereof) associated with multiple webpages as well as information relating to navigation between the multiple webpages. For example, the schema can include a first portion associated with a first webpage that includes a textbox element and a "Submit" user control. The schema can include a second portion associated with a second webpage that results from filling in the textbox element with text (e.g., corresponding to one or more attributes or postal codes) and interacting with the "Submit" user control. By doing so, the schema facilitates complex navigation through consecutive webpages to extract requested parameters in satisfaction of the server parameter request.

In some implementations, the parameter extraction platform 120 can update the schema associated with a particular server, such as based on an update to the associated webpage or navigation. For example, the parameter extraction platform 120 can transmit a second webpage request to the server, receive updated webpage data, determine that the webpage data (e.g., the format of the website) has changed, and regenerate a schema to update the software application such that the software application is consistent with the updated schema. In some implementations, the parameter extraction platform 120 transmits the webpage request at a pre-determined and/or variable (e.g., random) frequency, thereby enabling control over the system's ability to adapt to changing webpages and server information.

Moreover, in some embodiments, the parameter extraction platform 120 processes the extracted data elements (e.g., extracted data elements 312-1, 312-2, 312-3, and/or 312-4 of FIG. 3) using an LLM (e.g., the large-language model 314) to generate a tabulated dataset 316. To illustrate, the parameter extraction platform 120 can generate an LLM input (e.g., a textual or non-textual prompt) that includes a representation of the extracted data elements and requests parameters associated with the servers queried via the software applications. For example, the LLM input includes a set of parameter types specifying the classes of parameters to be extracted from the extracted data elements. In some implementations, the parameter extraction platform 120 generates the LLM input by providing a list of parameter types of interest to the LLM and generating a textual input accordingly.

Parameters can include values that characterize, describe, and/or specify features, elements, or information associated with particular servers and/or telecommunication networks. Parameter types can include identifiers of parameters that describe particular servers and/or telecommunication network providers, such as subscriber plan information (e.g., plan names, pricing details, data limits, call and SMS limits, international calling parameters, roaming parameters, and other suitable parameters), network coverage (e.g., coverage maps, signal strength information, availability in specific geographical regions), service availability (e.g., the types of services offered, such as 4G, 5G, broadband, and service areas), and customer support information (e.g., support hours, device warranty information, etc.). In some implementations, the prompt includes an indication of device compatibility parameters (e.g., supported devices, device-specific plans, etc.) and/or financial parameters (e.g., credit requirements). Moreover, parameter types can identify server-related information, such as upload speeds, download speeds, access credentials, security credentials, and/or other suitable attributes of servers and/or telecommunication networks. In some implementations, the parameter extraction platform 120 can receive instructions to determine the values of particular types of parameters specified by a user, based on the extracted data elements.

In some implementations, the parameter extraction platform 120 generates the LLM input to include a requested format for the resulting output. For example, the LLM input includes a textual description of a tabular structure by which to organize determined parameters from the extracted data elements.

The parameter extraction platform 120 can provide the LLM input to the LLM (e.g., the large-language model 314) to generate an LLM response. The LLM response can comprise a tabulated dataset 316 that includes, for the different queried servers, parameters that correspond to the attribute value of the server parameter request (e.g., for the parameter types specified in the LLM prompt). The tabulated dataset 316 can be consistent with instructions and/or a format provided within the LLM input, including the specified parameters.

FIG. 6 is a schematic of a data structure 600 illustrating a tabulated dataset 602. For example, the tabulated dataset 602 includes parameter identifiers 606 and corresponding values 608 for each server (e.g., each telecommunication network) that is consistent with the specified attribute value (e.g., the locator value). For example, the tabulated dataset 602 includes values of particular subscription plan parameters for different plans, such as prices, data limits, and/or service levels for each plan and for each server/telecommunication network that is available for the given location. By doing so, the parameter extraction platform 120 facilitates the systematic, dynamic, modular, and adaptable collection, processing, and tabulation of different parameters associated with different servers (e.g., different subscription plans of telecommunication network providers), enabling users to access and analyze consistent, accurate, up-to-date data associated with subscriber plans, service areas, device compatibility, and server connectivity.

In some implementations, the parameter extraction platform 120 can store the tabulated dataset within a parameter database (e.g., the parameter database 318 of FIG. 3). The parameter extraction platform 120 can store the tabulated dataset within an entry according to the attribute value (e.g., the location identifier 302 and/or associated locator value). By doing so, the parameter extraction platform 120 enables the evaluation of parameters associated with different servers (e.g., associated telecommunication network providers) across various locations and/or attributes, enabling larger-scale analytics.

Process for Extracting and Processing Server Parameters

Figure 7:
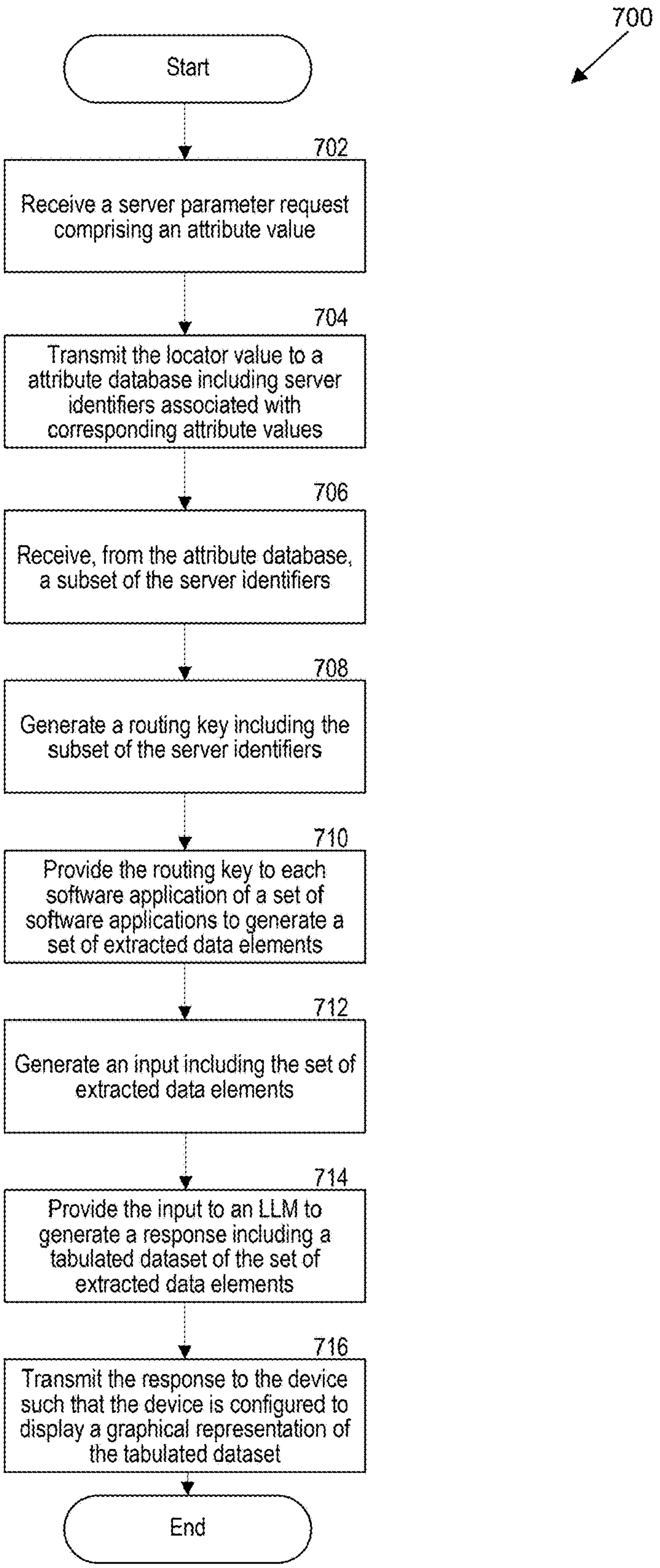
FIG. 7 is a flowchart illustrating a process for extracting and analyzing server parameters using modular software applications for display on a device, in accordance with aspects of the present technology.

FIG. 7 is a flowchart illustrating a process 700 for extracting and analyzing server parameters using modular software applications for display on a device. For example, process 700 enables automated extraction and analysis of server-related parameters (e.g., associated with telecommunication network providers) in a modular, adaptive, and dynamic manner.

At operation 702, the parameter extraction platform 120 can receive a server parameter request including an attribute value. For example, the parameter extraction platform 120 receives, from a device, a server parameter request comprising an attribute value. The server parameter request can include a request for parameters associated with the attribute value. As an illustrative example, the parameter extraction platform 120 can receive a locator value, such as a ZIP code, to query parameters relating to available telecommunication network provider plans within the area. By doing so, the parameter extraction platform 120 ensures that information relating to the telecommunication networks is specific to the provided geographical location, improving the relevance and specificity of the requested server parameter information.

At operation 704, the parameter extraction platform 120 can transmit the attribute value to an attribute database that includes server identifiers associated with corresponding attribute values. For example, the parameter extraction platform 120 transmits the attribute value to an attribute database that includes server identifiers associated with corresponding attribute values. As an illustrative example, the parameter extraction platform 120 can query the attribute database to retrieve server identifiers associated with telecommunication network providers that offer services in an area associated with a particular ZIP code corresponding to the locator value. By doing so, the parameter extraction platform 120 ensures that retrieved parameters in response to the server parameter request are associated with the particular attribute(s) included therein, enabling probing of only relevant servers.

At operation 706, the parameter extraction platform 120 can receive, from the attribute database, a subset of the server identifiers. For example, the parameter extraction platform 120 receives, from the attribute database, a subset of the server identifiers corresponding to a set of servers. Each server identifier of the subset can be associated with the attribute value. As an illustrative example, the parameter extraction platform 120 can receive a list of URL addresses and/or IP addresses corresponding to telecommunication network providers, and/or their servers, that service the given location. By doing so, the parameter extraction platform 120 enables extraction of server parameters (e.g., subscriber plan information) from relevant servers (e.g., relevant websites).

At operation 708, the parameter extraction platform 120 can generate a routing key including the subset of the server identifiers. As an illustrative example, the parameter extraction platform 120 generates a data structure that identifies particular servers (e.g., web domains) and/or associated software applications that are consistent with the provided ZIP code, such as website URLs that are associated with telecommunication network providers that service the location associated with the ZIP code. By doing so, the parameter extraction platform 120 can provide the attribute and/or locator value to relevant software applications that enable querying of suitable websites and/or servers.

At operation 710, the parameter extraction platform 120 can provide the routing key to each software application of a set of software applications to generate a set of extracted data elements. For example, based on the routing key, the parameter extraction platform 120 provides the attribute value to each software application of a set of software applications to generate a set of extracted data elements. Each software application of the set of software applications can correspond to a particular server identifier of the subset of the server identifiers. Each extracted data element can include information associated with a corresponding server of the set of servers. As an illustrative example, the parameter extraction platform 120 can provide the ZIP code of the server parameter request to a set of software applications, each of which can query corresponding servers to retrieve information associated with available subscriber plans for the particular ZIP code. By doing so, the parameter extraction platform 120 can improve efficiency by querying only relevant servers for the requested information. In some implementations, the software applications are modular, enabling parallel computation, thereby reducing the time taken to query the servers via the software applications.

In some implementations, the parameter extraction platform 120 provides the attribute value to software applications to generate extracted data elements accordingly. For example, the parameter extraction platform 120 identifies, for a first server identifier of the routing key, a software application of the set of software applications. The software application can be communicably linked to a first server of the set of servers. The parameter extraction platform 120 can transmit the attribute value to the identified software application. The parameter extraction platform 120 can receive, from the identified software application, an extracted data element for the corresponding server. The extracted data element can include textual information relating to parameters associated with the attribute value and the corresponding server. As an illustrative example, the parameter extraction platform 120 provides the ZIP code as the attribute value to the identified software application, which can query the corresponding server for subscription plan information associated with the ZIP code. For example, the extracted data element includes webpage data that includes pricing, plan names, data limits, and other relevant parameters associated with telecommunication networks servicing the location associated with the ZIP code. By doing so, the parameter extraction platform 120 enables extraction and analysis of updated, localized server parameter information (e.g., associated with telecommunication services).

In some implementations, the parameter extraction platform 120 generates a software application by generating a schema according to webpage data. For example, the parameter extraction platform 120 determines a server address associated with a server identifier of the set of servers. The parameter extraction platform 120 can transmit a webpage request to a server associated with the determined server address. In response to the webpage request, the parameter extraction platform 120 can receive webpage data from the server. The webpage data can include a first set of webpage elements. The parameter extraction platform 120 can generate, based on the webpage data, a schema for the server. The schema can include a set of element identifiers and a set of position information. The set of element identifiers and the set of position information can correspond to the first set of webpage elements of the webpage data. The parameter extraction platform 120 can generate a software application of the set of software applications. The software application can include the generated schema. The generated software application can be communicably linked to the server. As an illustrative example, the parameter extraction platform 120 can generate a schema based on webpage data from a website associated with a telecommunication network provider that services the provided ZIP code. The schema can identify and position elements of the webpage, including locations corresponding to plan names, prices, data limits, and associated user controls (e.g., webpage controls). By doing so, the system can generate software applications dynamically and modularly in a manner that is tailored to the website or webpage format of the associated server.

In some implementations, the parameter extraction platform 120 updates the software application in response to monitoring webpage data associated with a server. For example, the parameter extraction platform 120 transmits a second webpage request to the server. In response to the second webpage request, the parameter extraction platform 120 receives updated webpage data from the server. The updated webpage data can include a second set of webpage elements. The parameter extraction platform 120 can determine that the second set of webpage elements is not identical to the first set of webpage elements. Based on determining that the second set of webpage elements is not identical to the first set of webpage elements, the parameter extraction platform 120 can generate an updated schema for the server. The updated schema can correspond to the second set of webpage elements. The parameter extraction platform 120 can update, based on the updated schema, the software application of the set of software applications. As an illustrative example, the parameter extraction platform 120 can monitor webpages associated with the servers for changes in their formats, updating the schemas accordingly. For example, the parameter extraction platform 120 can identify whether webpage elements have changed in position or have been added or deleted and generate an updated schema reflecting these changes. By doing so, the parameter extraction platform 120 can enable the generated software applications to remain functional and up to date upon website changes.

At operation 712, the parameter extraction platform 120 can generate an input including the set of extracted data elements. For example, the parameter extraction platform 120 generates an input to an LLM that includes the set of extracted data elements. As an illustrative example, the parameter extraction platform 120 generates an input to the LLM that describes parameters to be determined based on the associated extracted data element, such as an identifier of plan names, pricing details, data allowance, and/or other suitable parameter identifiers. By doing so, the parameter extraction platform 120 enables organization of the retrieved data in a customizable, organized format.

In some implementations, the parameter extraction platform 120 generates the LLM input by determining parameter identifiers associated with server parameters of interest. For example, the parameter extraction platform 120 determines a set of parameter identifiers. Each parameter identifier of the set of parameter identifiers can indicate a parameter type. The parameter extraction platform 120 can generate the input including a query to extract, from each extracted data element of the set of extracted data elements, parameters corresponding to the set of parameter identifiers. As an illustrative example, the query includes a textual prompt including the parameter identifiers (e.g., words or phrases describing the parameter types).

At operation 714, the parameter extraction platform 120 provides the input to an LLM to generate a response including a tabulated dataset of the set of extracted data elements. For example, the parameter extraction platform 120 provides the input to the LLM to generate a response comprising a tabulated dataset of the set of extracted data elements. The tabulated dataset can include, for each extracted data element of the set of extracted data elements, a corresponding set of parameters. As an illustrative example, the parameter extraction platform 120 can generate an output according to the specifications within the LLM input, where the output includes parameter information specific to the attribute value of the server parameter request (e.g., subscriber plan parameters specific to a particular ZIP code). By doing so, the parameter extraction platform 120 enables analysis of information relating to particular parameters across various servers and various attributes (e.g., locations), thereby enabling large-scale analytics of server parameters.

At operation 716, the parameter extraction platform 120 can transmit the response to the device such that the device is configured to display a graphical representation of the tabulated dataset. For example, the parameter extraction platform 120 transmits the response to the device such that the device is configured to display a graphical representation of the tabulated dataset. As an illustrative example, the parameter extraction platform 120 can generate a graphical representation of the tabulated dataset and/or multiple tabulated datasets (e.g., associated with various attribute values/locator values). For example, the parameter extraction platform 120 enables visualization on a map of particular parameters associated with different servers (e.g., visualization of mobile data plans by location and by telecommunication network provider) based on the retrieved parameter information.

In some implementations, the parameter extraction platform 120 monitors the attribute database at a determined frequency to update the tabulated dataset. For example, the parameter extraction platform 120 determines a frequency for monitoring the attribute database. The parameter extraction platform 120 can monitor, at the determined frequency, the attribute database to detect an update to the server identifiers associated with the corresponding attribute values. In response to detecting the update to the server identifiers, the parameter extraction platform 120 can determine an updated subset of the server identifiers. Each server identifier of the updated subset can be associated with the attribute value. The parameter extraction platform 120 can provide an updated input to the LLM to generate an updated tabulated dataset. The updated input can include an updated set of extracted data elements associated with servers corresponding to the updated subset of the server identifiers. The updated tabulated dataset can include, for each extracted data element of the updated set of extracted data elements, a corresponding updated set of parameters. As an illustrative example, the parameter extraction platform 120 can update the list of servers (e.g., telecommunication networks) that are associated with a particular location, such as where there is a change in coverage area for a particular network. By doing so, the parameter extraction platform 120 can dynamically update server information specific to different attributes. In some implementations, the frequency is variable (e.g., with random queries or monitoring). Additionally or alternatively, the frequency is pre-set and consistent.

In some implementations, the parameter extraction platform 120 generates an updated routing key based on an additional attribute value that is not included within the attribute database. For example, the parameter extraction platform 120 stores the tabulated dataset, corresponding to the locator value, in a parameter database indexed by locator values. The parameter extraction platform 120 can determine a set of locator values associated with the parameter database. The parameter extraction platform 120 can determine, based on the set of locator values, an additional locator value of the location database, where the additional locator value is not included in the set of locator values. The parameter extraction platform 120 can generate an additional routing key comprising a second subset of the server identifiers associated with the additional locator value. The additional routing key can enable generation of an additional tabulated dataset including parameters associated with the additional locator value. As an illustrative example, the parameter extraction platform 120 can automatically generate further information relating to server parameters of other attributes (e.g., associated with other locations that have not been evaluated or investigated previously), thereby enabling automated surveying of server parameters associated with different attributes.

Computer System

Figure 8:
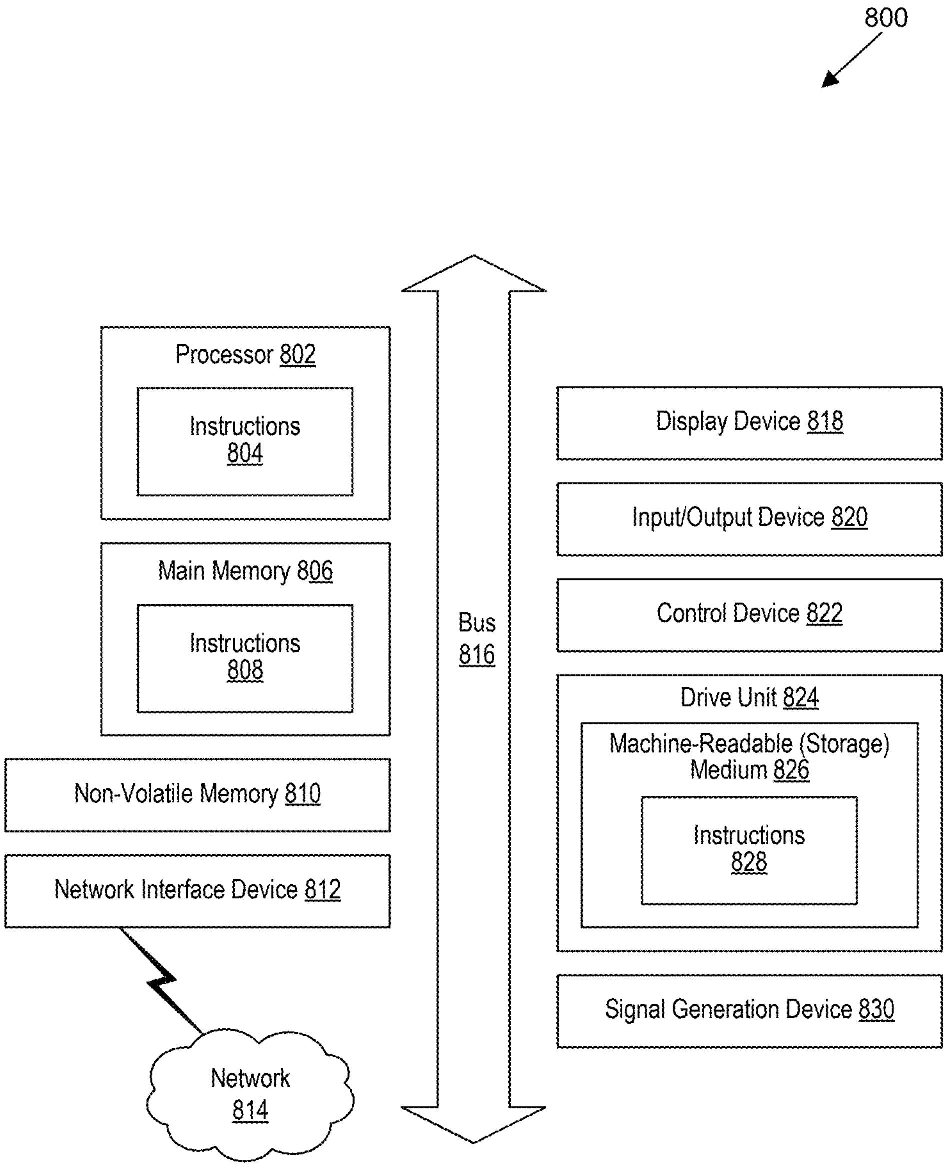
FIG. 8 is a block diagram that illustrates components of a computing device, in accordance with aspects of the present technology.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer (SBC) system, or a distributed system such as a mesh of computer systems or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable (storage) medium 826) can be local, remote, or distributed. Although shown as a single medium, the machine-readable (storage) medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable (storage) medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

receive, from a device, a server parameter request comprising a locator value, wherein the server parameter request comprises a request for parameters associated with the locator value, and wherein the locator value comprises a geographical indicator associated with a location;

transmit the locator value to a location database comprising server identifiers associated with corresponding locator values;

receive, from the location database, a subset of the server identifiers corresponding to a set of servers, wherein each server identifier of the subset is associated with the location;

generate a routing key comprising the subset of the server identifiers;

based on the routing key, provide the locator value to each software application of a set of software applications to generate a set of extracted data elements, wherein each software application of the set of software applications corresponds to a particular server identifier of the subset of the server identifiers, and wherein each extracted data element includes information associated with a corresponding server of the set of servers;

generate an input to a large-language model (LLM) comprising the set of extracted data elements;

provide the input to the LLM to generate a response comprising a tabulated dataset of the set of extracted data elements, wherein the tabulated dataset includes, for each extracted data element of the set of extracted data elements, a corresponding set of parameters; and transmit the response to the device such that the device is configured to display a graphical representation of the tabulated dataset.

2. The non-transitory, computer-readable storage medium of claim 1, wherein the instructions for generating the set of extracted data elements cause the system to:

identify, for a first server identifier of the routing key, a software application of the set of software applications, wherein the software application is communicably linked to a first server of the set of servers;

transmit the locator value to the identified software application; and receive, from the identified software application, an extracted data element for the corresponding server, wherein the extracted data element comprises textual information relating to parameters associated with the location and the corresponding server.

3. The non-transitory, computer-readable storage medium of claim 1, wherein the instructions further cause the system to:

determine a frequency for monitoring the location database;

monitor, at the determined frequency, the location database to detect an update to the server identifiers associated with the corresponding locator values;

in response to detecting the update to the server identifiers, determine an updated subset of the server identifiers, wherein each server identifier of the updated subset is associated with the location of the locator value; and provide an updated input to the LLM to generate an updated tabulated dataset, wherein the updated input comprises an updated set of extracted data elements associated with servers corresponding to the updated subset of the server identifiers, and wherein the updated tabulated dataset includes, for each extracted data element of the updated set of extracted data elements, a corresponding updated set of parameters.

4. The non-transitory, computer-readable storage medium of claim 1, wherein the instructions further cause the system to:

determine a server address associated with a server identifier of the set of servers;

transmit a webpage request to a server associated with the determined server address;

in response to the webpage request, receive webpage data from the server, wherein the webpage data comprises a first set of webpage elements;

generate, based on the webpage data, a schema for the server, wherein the schema comprises a set of element identifiers and a set of position information, and wherein the set of element identifiers and the set of position information correspond to the first set of webpage elements of the webpage data; and generate a software application of the set of software applications, wherein the software application comprises the generated schema, and wherein the generated software application is communicably linked to the server.

5. The non-transitory, computer-readable storage medium of claim 4, wherein the instructions further cause the system to:

transmit a second webpage request to the server;

in response to the second webpage request, receive updated webpage data from the server, wherein the updated webpage data comprises a second set of webpage elements;

determine that the second set of webpage elements is not identical to the first set of webpage elements;

based on determining that the second set of webpage elements is not identical to the first set of webpage elements, generate an updated schema for the server, wherein the updated schema corresponds to the second set of webpage elements; and update, based on the updated schema, the software application of the set of software applications.

6. The non-transitory, computer-readable storage medium of claim 1, wherein the instructions for generating the input cause the system to:

determine a set of parameter identifiers, wherein each parameter identifier of the set of parameter identifiers indicates a parameter type; and generate the input including a query to extract, from each extracted data element of the set of extracted data elements, parameters corresponding to the set of parameter identifiers.

7. The non-transitory, computer-readable storage medium of claim 1, wherein the instructions further cause the system to:

store the tabulated dataset, corresponding to the locator value, in a parameter database indexed by locator values;

determine a set of locator values associated with the parameter database;

determine, based on the set of locator values, an additional locator value of the location database, wherein the additional locator value is not included in the set of locator values; and generate an additional routing key comprising a second subset of the server identifiers associated with the additional locator value, wherein the additional routing key enables generation of an additional tabulated dataset including parameters associated with the additional locator value.

8. A system comprising:

at least one hardware processor; and at least one non-transitory memory storing instructions, which, when executed by the at least one hardware processor, cause the system to:

receive, from a device, a server parameter request comprising a locator value, wherein the server parameter request comprises a request for parameters associated with the locator value, and wherein the locator value comprises a geographical indicator associated with a location;

transmit the locator value to a location database comprising server identifiers associated with corresponding locator values;

receive, from the location database, a subset of the server identifiers corresponding to a set of servers;

generate a routing key comprising the subset of the server identifiers;

based on the routing key, provide the locator value to each software application of a set of software applications to generate a set of extracted data elements, wherein each extracted data element includes information associated with a corresponding server of the set of servers;

generate an input to a large-language model (LLM) comprising the set of extracted data elements;

provide the input to the LLM to generate a response comprising a tabulated dataset of the set of extracted data elements, wherein the tabulated dataset includes, for each extracted data element of the set of extracted data elements, a corresponding set of parameters; and store the tabulated dataset in a parameter database indexed by locator values, wherein the parameter database is accessible to the device.

9. The system of claim 8, wherein the instructions for generating the set of extracted data elements cause the system to:

identify, for a first server identifier of the routing key, a software application of the set of software applications, wherein the software application is communicably linked to a first server of the set of servers;

transmit the locator value to the identified software application; and receive, from the identified software application, an extracted data element for the corresponding server, wherein the extracted data element comprises textual information relating to parameters associated with the location and the corresponding server.

10. The system of claim 8, wherein the instructions further cause the system to:

determine a frequency for monitoring the location database;

monitor, at the determined frequency, the location database to detect an update to the server identifiers associated with the corresponding locator values;

in response to detecting the update to the server identifiers, determine an updated subset of the server identifiers, wherein each server identifier of the updated subset is associated with the location of the locator value; and provide an updated input to the LLM to generate an updated tabulated dataset, wherein the updated input comprises an updated set of extracted data elements associated with servers corresponding to the updated subset of the server identifiers, and wherein the updated tabulated dataset includes, for each extracted data element of the updated set of extracted data elements, a corresponding updated set of parameters.

11. The system of claim 8, wherein the instructions further cause the system to:

determine a server address associated with a server identifier of the set of servers;

transmit a webpage request to a server associated with the determined server address;

in response to the webpage request, receive webpage data from the server, wherein the webpage data comprises a first set of webpage elements;

generate, based on the webpage data, a schema for the server, wherein the schema comprises a set of element identifiers and a set of position information, and wherein the set of element identifiers and the set of position information correspond to the first set of webpage elements of the webpage data; and generate a software application of the set of software applications, wherein the software application comprises the generated schema, and wherein the generated software application is communicably linked to the server.

12. The system of claim 11, wherein the instructions further cause the system to:

transmit a second webpage request to the server;

in response to the second webpage request, receive updated webpage data from the server, wherein the updated webpage data comprises a second set of webpage elements;

determine that the second set of webpage elements is not identical to the first set of webpage elements;

based on determining that the second set of webpage elements is not identical to the first set of webpage elements, generate an updated schema for the server, wherein the updated schema corresponds to the second set of webpage elements; and update, based on the updated schema, the software application of the set of software applications.

13. The system of claim 8, wherein the instructions for generating the input cause the system to:

determine a set of parameter identifiers, wherein each parameter identifier of the set of parameter identifiers indicates a parameter type; and generate the input including a query to extract, from each extracted data element of the set of extracted data elements, parameters corresponding to the set of parameter identifiers.

14. The system of claim 8, wherein the instructions further cause the system to:

determine a set of locator values associated with the parameter database;

determine, based on the set of locator values, an additional locator value of the location database, wherein the additional locator value is not included in the set of locator values; and generate an additional routing key comprising a second subset of the server identifiers associated with the additional locator value, wherein the additional routing key enables generation of an additional tabulated dataset including parameters associated with the additional locator value.

15. A method comprising:

receiving, from a device, a server parameter request comprising an attribute value, wherein the server parameter request comprises a request for parameters associated with the attribute value;

transmitting the attribute value to an attribute database comprising server identifiers associated with corresponding attribute values;

receiving, from the attribute database, a subset of the server identifiers corresponding to a set of servers, wherein each server identifier of the subset is associated with the attribute value;

generating a routing key comprising the subset of the server identifiers;

based on the routing key, providing the attribute value to each software application of a set of software applications to generate a set of extracted data elements, wherein each software application of the set of software applications corresponds to a particular server identifier of the subset of the server identifiers, and wherein each extracted data element includes information associated with a corresponding server of the set of servers;

generating an input to a large-language model (LLM) comprising the set of extracted data elements;

providing the input to the LLM to generate a response comprising a tabulated dataset of the set of extracted data elements, wherein the tabulated dataset includes, for each extracted data element of the set of extracted data elements, a corresponding set of parameters; and transmitting the response to the device such that the device is configured to display a graphical representation of the tabulated dataset.

16. The method of claim 15, wherein generating the set of extracted data elements comprises:

identifying, for a first server identifier of the routing key, a software application of the set of software applications, wherein the software application is communicably linked to a first server of the set of servers;

transmitting the attribute value to the identified software application; and receiving, from the identified software application, an extracted data element for the corresponding server, wherein the extracted data element comprises textual information relating to parameters associated with the attribute value and the corresponding server.

17. The method of claim 15, further comprising:

determining a frequency for monitoring the attribute database;

monitoring, at the determined frequency, the attribute database to detect an update to the server identifiers associated with the corresponding attribute values;

in response to detecting the update to the server identifiers, determining an updated subset of the server identifiers, wherein each server identifier of the updated subset is associated with the attribute value; and providing an updated input to the LLM to generate an updated tabulated dataset, wherein the updated input comprises an updated set of extracted data elements associated with servers corresponding to the updated subset of the server identifiers, and wherein the updated tabulated dataset includes, for each extracted data element of the updated set of extracted data elements, a corresponding updated set of parameters.

18. The method of claim 15, further comprising:

determining a server address associated with a server identifier of the set of servers;

transmitting a webpage request to a server associated with the determined server address;

in response to the webpage request, receiving webpage data from the server, wherein the webpage data comprises a first set of webpage elements;

generating, based on the webpage data, a schema for the server, wherein the schema comprises a set of element identifiers and a set of position information, and wherein the set of element identifiers and the set of position information correspond to the first set of webpage elements of the webpage data; and generating a software application of the set of software applications, wherein the software application comprises the generated schema, and wherein the generated software application is communicably linked to the server.

19. The method of claim 18, further comprising:

transmitting a second webpage request to the server;

in response to the second webpage request, receiving updated webpage data from the server, wherein the updated webpage data comprises a second set of webpage elements;

determining that the second set of webpage elements is not identical to the first set of webpage elements;

based on determining that the second set of webpage elements is not identical to the first set of webpage elements, generating an updated schema for the server, wherein the updated schema corresponds to the second set of webpage elements; and updating, based on the updated schema, the software application of the set of software applications.

20. The method of claim 15, wherein generating the input comprises:

determining a set of parameter identifiers, wherein each parameter identifier of the set of parameter identifiers indicates a parameter type; and generating the input including a query to extract, from each extracted data element of the set of extracted data elements, parameters corresponding to the set of parameter identifiers.

* * * * *